March 8, 1932.  J. L. DRAKE  1,848,112
PROCESS AND APPARATUS FOR PRODUCING SHEETS OF GLASS
Filed July 14, 1928
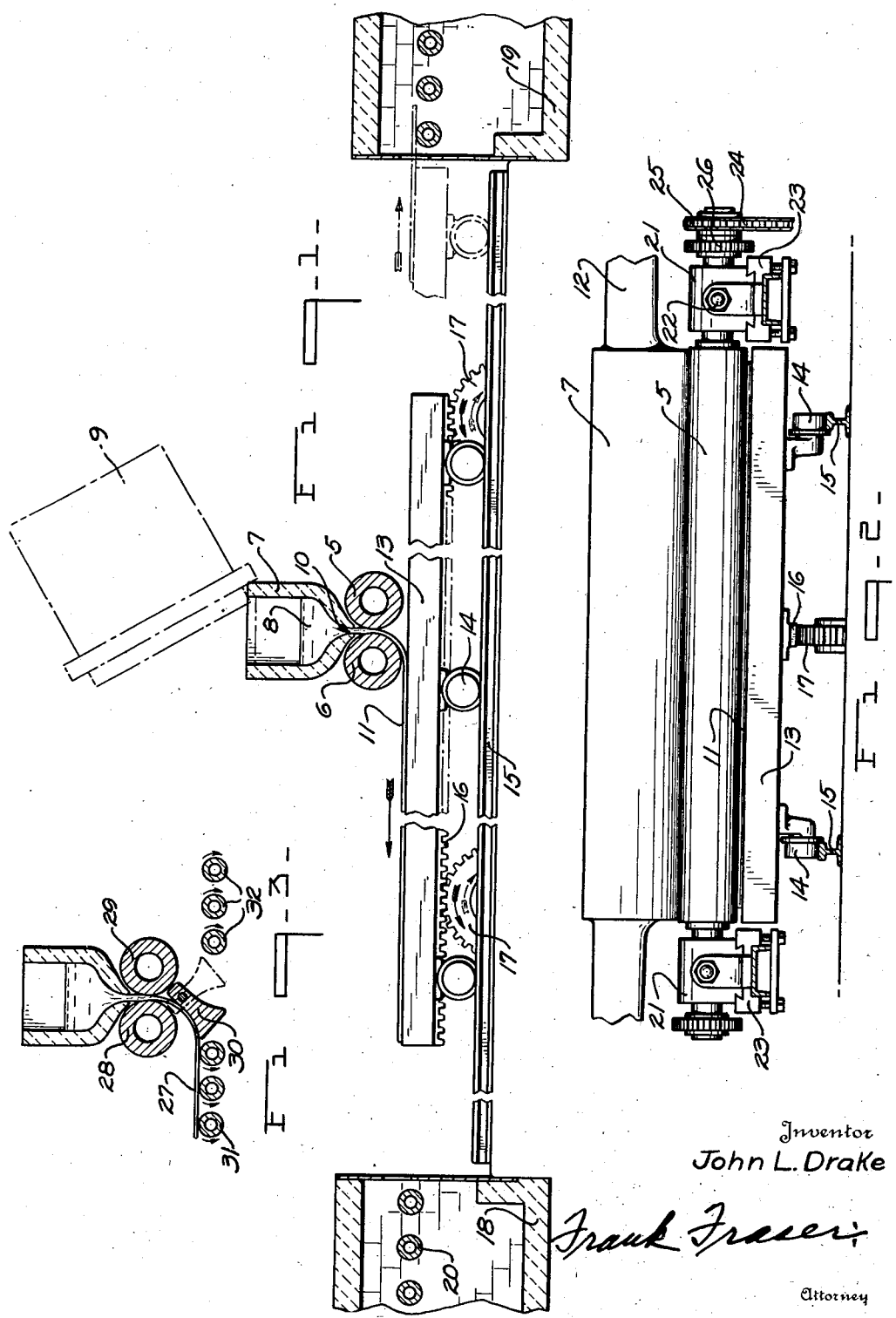
Inventor
John L. Drake
Frank Fraser
Attorney Patented Mar. 8, 1932

1,848,112

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEETS OF GLASS

Application filed July 14, 1928. Serial No. 292,829.

The present invention relates to a process and apparatus for producing sheets of glass.

An important object of the invention is to provide a process and apparatus for producing sheets of glass wherein sheet forming mechanism is adapted to reduce molten glass to sheet form, the sheet being conveyed alternately and longitudinally in first one direction from the sheet forming means, and then in the opposite direction.

Another object of the invention is to provide such means wherein a pair of opposed leers are provided, while sheet forming means are arranged between said leers and operated to feed the glass sheets formed thereby alternately to first one of said leers and then to the other.

A still further object of the invention is to provide means wherein a mass of molten glass may be reduced rapidly to sheet form and then passed relatively slowly through an annealing leer, the arrangement being such that alternate sheets are annealed in different annealing leers.

Other objects and advantages of the invention will become more apparent during the course of the following description when taken in connection with the accompanying drawings.

In the drawings wherein like numerals are employed to designate like parts throughout the same, Fig. 1 is an elevation of the apparatus, partially in section, Fig. 2 is a vertical transverse view thereof, and Fig. 3 is a fragmentary sectional view illustrating a detail.

In the drawings the numerals 5 and 6 designate two rolls adapted to be arranged in a manner to create a sheet forming pass. In one form of the invention a trough or receptacle 7 is mounted above the forming rolls and is adapted to contain a mass of molten glass 8. Although it is not absolutely necessary, it is preferred that the molten glass 8 be supplied from a pot 9 because of the high quality of pot glass, and if pot glass is used, the size of the trough 7 is preferably such that it will contain an entire potful of glass at one time. The trough 7 is provided with an outlet 10 positioned directly above the sheet forming pass between the rolls so that the molten glass can flow downwardly through the pass and be reduced to a sheet 11 of substantially predetermined and uniform thickness. As clearly shown in Fig. 2, the trough or receptacle 7 is provided with end members 12 by which means the trough can be adjusted with respect to the sheet forming pass. Also, the means 12 facilitate removal of the trough from operative position, etc.

Adapted to be moved beneath the sheet forming pass is a table or conveyor 13 mounted on wheels 14 running on a track 15. The truck or table 13 may be provided with a rack bar 16 on its lower surface with which may mesh a drive pinion 17 driven by any suitable source of power. As shown in Fig. 1, a plurality of the drive pinions 17 are provided.

It will be noted that the tracks 15 are arranged between opposed leers 18 and 19. Each of said leers is provided with a series of conveyor rolls or the like 20, while the temperature of the leers can be controlled for proper annealing as will be readily understood in the art. In lieu of the conveyor rolls 20, endless type conveyors or the like may be used.

In operation, properly melted and refined molten glass is deposited within the trough 7 which directs said glass to the sheet forming pass created between the rolls 5 and 6. As indicated in dotted lines in Fig. 1, the sheet 11 is being deflected about the rolling member 6 and deposited upon the table 13. When the sheet is deflected in this direction, the table 13 is positively moved toward the annealing leer 18. If a single table is used to receive the sheet 11, its length is such that it will support the entire sheet formed from the mass of molten glass 8. In lieu of the single table, however, a plurality of relatively small tables can be coupled together and moved as a unit beneath said sheet forming mechanism. To prevent undue chilling of the mass of glass 8 in the receptacle 7, it is desirable to reduce the mass of molten glass to sheet form at a relatively high rate of speed. Therefore, the peripheral speed of the sheet forming rolls is relatively fast. To prevent injury to the sheet, the table or group of tables 13 is moved at a speed substantially identical to the peripheral speed of the sheet forming rolls so that the sheet 11 will be conveyed toward the leer 18 at the forming speed. As soon as the entire sheet is deposited upon the table 13, its speed forward toward the annealing leer may be reduced and the sheet introduced within the leer at a speed materially less than the forming speed. Although a solid top table 13 is illustrated, it will be understood that the table can be provided with an endless type conveyor which will feed the sheet into the leer. On the other hand, the sheet can be readily pushed from the type of table illustrated.

As soon as the sheet has been removed from the table 13 and passed into the annealing leer, a second potful of glass can be arranged within the trough 7 and the table moved in the opposite direction or toward the annealing leer 19 to receive a second sheet of glass. The second sheet is therefore deflected about the roll 5 and carried forward toward the leer 19 and transferred to said leer as in the case of the sheet being transferred to the leer 18. Therefore, it will be seen that the sheets are alternately fed first into the leer 18 and then into the leer 19.

As shown in Fig. 2, the rolls 5 and 6 are mounted in adjustable bearings or journals 21 movable by means of bolts 22 which slide the bearings in the guideways 23. In this manner the size or width of the sheet forming pass can be controlled to determine accurately the thickness of sheet produced, while by proper adjustment various thicknesses of sheet can be formed. The rolls are positively driven and as shown a drive chain 24, deriving power from a suitable source of supply, rotates one of the rolls by means of a sprocket 25 carried thereon. Each roll is provided with a pinion 26, which pinions mesh so that the rolls are positively driven in opposite directions, the teeth of the pinions being such that they will permit adjustment of the rolls without disturbing the drive thereof.

In Fig. 3, a slightly modified form of construction is illustrated wherein the sheet 27, illustrated therein, passes from the sheet forming rolls 28 and 29, and is deflected either to the right or left by means of a deflecting slab 30. As shown in full lines, the slab 30 is adjusted to direct the sheet 27 over the conveyor rolls 31, while in dotted lines the slab is illustrated in a position to deflect a sheet over the conveyor rolls 32. It will be noted that in place of the table or group of tables 13, rolls are provided to receive the sheet and to convey the same toward the annealing leer. As in the case of the tables 13, the rolls are provided with variable speed drives to permit a rapid formation of the sheet and a subsequent reduction in speed thereof. Thus, during the rolling of the mass of molten glass from which the sheet 27 is formed, the peripheral speed of the rolls 31 or 32, as the case may be, is substantially identical with the peripheral speed of the sheet forming rolls 28 and 29. After the entire sheet has been formed, however, the peripheral speed of these conveying rolls can be materially reduced to permit a relatively slow passage of the sheet through the annealing leer. By feeding the sheets formed on a single rolling mechanism into two leers, the relatively slow annealing speed does not unnecessarily curtail production.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, consisting in moving a mass of molten glass downwardly through a sheet forming pass created between a pair of rotatable members, deflecting said sheet and passing it in a substantially horizontal plane therefrom, conveying the sheet forwardly in a substantially straight line into and through an annealing chamber, then flowing a second mass of molten glass downwardly through said sheet forming pass and deflecting it into a direction opposite to the direction of travel of the first mentioned sheet, and in conveying the second sheet formed forwardly in a substantially straight line into and through an annealing chamber.

2. The process of producing sheet glass, consisting in moving a mass of molten glass downwardly through a sheet forming pass created between a pair of rotatable members, deflecting said sheet and passing it in a substantially horizontal plane therefrom, then flowing a second mass of molten glass downwardly through said sheet forming pass and deflecting it into a direction opposite to the direction of travel of the first mentioned sheet, and in conveying the sheets forwardly in substantially straight horizontal paths into and through different annealing chambers.

3. In sheet glass apparatus, a pair of opposed leers positioned with their intake ends facing and in alignment with one another, sheet forming means arranged therebetween, and reciprocating means between the intake ends of said leers and movable in a definite horizontal path for conveying the sheets of glass from the forming means to first one of said leers and then to the other.

4. In sheet glass apparatus, a pair of opposed leers positioned with their intake ends facing and in alignment with one another, a pair of rolls disposed between the intake ends of said leers and arranged to create a sheet forming pass, means for supplying molten glass thereto, which glass passes through the sheet forming pass and is reduced to sheet form, and reciprocating means between the intake ends of said leers and movable in a definite horizontal path for conveying first one sheet to one annealing leer, and then the next sheet to the other annealing leer.

5. In sheet glass apparatus, a pair of opposed leers, a pair of rolls positioned between said leers and arranged to create a sheet forming pass, means for supplying molten glass thereto, which glass is reduced to sheet form by said rolls, a pivotally mounted deflecting member positioned beneath the sheet forming pass for directing the sheet in one direction or in the opposite direction with respect to the forming rolls, and means for receiving the sheet and conveying it to the desired leer.

6. In sheet glass apparatus, a pair of rolls arranged to create a sheet forming pass, means for supplying molten glass thereto, which glass is reduced to sheet form by said rolls, opposed conveying means for carrying the sheets formed in opposite directions, and a movable deflecting member mounted beneath the sheet forming pass for directing the sheet onto the desired conveying means.

7. In sheet glass apparatus, a pair of rolls arranged to create a sheet forming pass, means for supplying molten glass thereto, which glass is reduced to sheet form by said rolls, opposed conveying means for carrying the sheets formed in opposite directions, and a pivotally mounted deflecting member positioned beneath the sheet forming pass and adapted to be swung about its pivot to direct the sheet onto the desired conveying means.

8. In sheet glass apparatus, a pair of opposed leers, a pair of forming rolls positioned between the leers and arranged to create a sheet forming pass, means for supplying molten glass thereto, which glass is reduced to sheet form by said rolls, movable means mounted beneath the forming rolls for directing the sheet as it is formed either in one horizontal direction or in the opposite direction with respect to the forming rolls, and means for receiving the sheet from said movable means and conveying it to the desired leer.

9. In sheet glass apparatus, a pair of opposed leers, sheet forming means positioned between the leers, and means for receiving the sheet from the forming means and conveying it to either leer as desired, a portion of the said sheet forming means being adjustable to cause the sheet to pass either in one horizontal direction or in the opposite direction dependent upon to which leer said sheet is to be conveyed.

10. In sheet glass apparatus, a pair of opposed leers, a plurality of rolls arranged to create a sheet forming pass, means for supplying molten glass thereto, which glass is reduced to sheet form by said rolls, a pivotally mounted deflecting member positioned beneath the forming rolls and adapted to be swung about its pivot to direct the sheet as it is formed either in one horizontal direction or in the opposite direction, and means for receiving the sheet thereupon and carrying it forwardly to the desired leer.

Signed at Toledo, in the county of Lucas and State of Ohio, this 25th day of June, 1928.

JOHN L. DRAKE.